United States Patent [19]

Stanley et al.

[11] 3,725,658
[45] Apr. 3, 1973

[54] APPARATUS AND METHOD FOR CONTINUOUSLY DETECTING OXYGEN IN A GAS STREAM

[75] Inventors: Charles C. Stanley, Canoga Park; John L. Kropp, Redondo Beach, both of Calif.

[73] Assignee: TRW Inc., Redondo Beach, Calif.

[22] Filed: Jan. 18, 1971

[21] Appl. No.: 106,987

Related U.S. Application Data

[63] Continuation-in-part of Ser. No. 85,029, Oct. 29, 1970, abandoned, which is a continuation-in-part of Ser. No. 27,963, April 13, 1970, abandoned.

[52] U.S. Cl. ............250/71 R, 23/232 E, 23/254 E, 250/71 T
[51] Int. Cl. ......................G01n 21/26, G01n 21/38
[58] Field of Search.................250/71 R; 204/1, 195; 252/301.2, 301.3; 23/230, 259

[56] References Cited

UNITED STATES PATENTS 3,271,113 9/1966 Pal..................................250/71 R X
3,105,908 10/1963 Burkhardt et al..............250/71 R X Primary Examiner—Archie R. Borchelt
Attorney—Daniel T. Anderson, Alan D. Akers and Edwin A. Oser

[57] ABSTRACT

An apparatus and method for continuously detecting oxygen in a carrier gas stream. The apparatus employs a sensor film comprising a fluorescent material emitting from 3000 – 8000 A, dissolved in a carrier or solvent, the film being supported on a suitable substrate. Exciting radiation of about 2000 – 6500 A is applied to the film causing the fluorescent material to emit.

Oxygen contained in the gas stream is rapidly dissolved into, and purged out of the film. The dissolved oxygen will quench the fluorescent emission, and the extent of quenching is proportional to the oxygen content of the gas stream.

The dissolving and purging cycle occurs with sufficient speed to enable the oxygen analysis of breath to be determined on a real time basis.

9 Claims, 9 Drawing Figures

Charles C. Stanley
John L. Kropp
INVENTORS

Charles C. Stanley
John L. Kropp
*INVENTOR.*

Charles C. Stanley
John L. Kropp
INVENTORS

Fig. 8

Charles C. Stanleley
John L. Kropp
INVENTORS

APPARATUS AND METHOD FOR CONTINUOUSLY DETECTING OXYGEN IN A GAS STREAM

This application is a continuation-in-part of application Ser. No. 85,029 filed Oct. 29, 1970, now abandoned, which in turn is a continuation-in-part of application Ser. No. 27,963 filed Apr. 13, 1970 and now abandoned.

This invention relates to a new and improved apparatus and method for detecting the oxygen content in a gas stream. More specifically, this invention relates to an apparatus and method for continuously detecting rapid changes in the oxygen content of the gas stream using fluorescent techniques.

The analysis of oxygen in a gas stream, particularly when the oxygen content is changing rapidly, for example, in human breathing is difficult, particularly if meaningful metabolytic information is to be obtained. The problem involves correlating heartbeat, breathing rates, and changes in oxygen content therewith and, in some cases, brain waves. The problem arises from the fact that it is difficult to analyze oxygen uptake and oxygen outlet with sufficient speed to permit correlation with the actual inhalation and exhalation in normal breathing. Preferably, such an oxygen measuring device should have a total response time of not more than 0.1 seconds in order to obtain a suitable correlation with inhalation and exhalation. Changes in the oxygen concentration could then be correlated with electrocardiogram readings and also with brain wave recordings. Also it is preferable that the total breath flow of a patient be monitored rather than a fraction of this flow.

Another problem presented in the detection and monitoring of oxygen from a patient's breath occurs during or after surgery, due to the fact that many, if not all, of the present anesthetics employed will either poison an oxygen detection system or interfere with the measurement of oxygen concentration. It is important to monitor the patient's ability during surgery to utilize oxygen since cardiac arrest is often occasioned by the inability of the body to utilize the oxygen which is inhaled. If a decrease in oxygen utilization by the body can be detected immediately, remedial steps can be taken. This situation also applied to the case where a patient is undergoing an electrocardiogram checkup. While the electrocardiogram is a very useful diagnostic tool, it is not an absolutely accurate device; many instances are known where a satisfactory electrocardiogram reading was obtained, but the patient died shortly thereafter due to a coronary. It is also believed that many fatal heart conditions are presaged by the inability of the body to properly utilize the oxygen taken in during breathing. Thus, the real time analysis of oxygen intake and outlet correlated with an electrocardiogram reading would be an extremely useful tool for diagnosing potential coronary attacks where an electrocardiogram by itself might disclose a normal heart condition.

A typical oxygen analyzer which can be employed to monitor post-cardiac surgery patients and study the cardiovascular system through the effects of exercise upon respiration is disclosed in U. S. Pat. Nos. 3,347,767 and 3,400,054. However, these devices will not measure total breath flow directly, and furthermore, their measurements are adversely affected by water vapor. The instrument is described further in Westinghouse Bulletin TD 99–251, September 1968.

The bulletin indicates that it is only the oxygen concentration in expired breath which is measured rather than both intake and expired breath together. Thus, the instrument would not be suitable for analyzing a gas stream containing oxygen where both the inlet and outlet oxygen concentrations are changing.

Other typical biomedical uses for oxygen analyzers include: monitoring ventilation during major surgery; research in cardiopulmonary physiology; metabolism studies; pharmacology research, experiments in space medicine and aircraft safety; testing effectiveness of mechanical respirator; and diagnosis of emphysema and related respiratory disorders.

Other applications for oxygen analyzers include: use in chemical plants for inert gas blanketing control; safety control in maintaining low oxygen in combustible mixtures; trace analyses of gases; use in refineries for control of oxygen in catalyst regeneration; and efficient combustion control for feed stock heaters. Power plants employ oxygen detectors to monitor combustion efficiency in boiler plants. Air and gas plants employ analyzers to detect impurities in inert gases and the purity of oxygen gas streams. The metallurgical industry requires oxygen detectors for efficient control of open hearths, reheat furnaces, and reverberatory furnaces; and for quality control of inert atmosphere annealing and heat treating furnaces. The ceramic and cement industry employs oxygen detectors for quality control of carbon oxidation from products fired in tunnel kilns and combustion control in rotary kilns. The food and beverage industry employs oxygen detectors for inert gas blanketing and industrial safety.

The prior art teaches that a varying concentration of oxygen in a gas stream can be measured by the quenching of photoluminescent compounds in solutions; a typical example will be found in the text, "Photoluminescence of Solutions" by C. A. Parker, published by Elsevier Publishing Company, 1968. On page 488 of the text, concentration curves of oxygen are shown which were obtained due to the quenching of a photoluminescent compound in a solution. However, the response time is in the order of several minutes whereas in the case of breathing, a response time of at least 0.1 seconds is required.

Thin films of phosphorescent material employed to detect oxygen are also known; however, the effect on the film is irreversible and it can only detect up to $10^{-3}$ Torr. Hence these type of thin films do not provide a useful device.

Thin films of fluorescent materials adsorbed onto porous glass also have been considered; however, the adsorbing effect of the glass results in the adsorption of contaminating substances such as water vapor and organic compounds which nullifies its utility for many applications.

It is, therefore, an object of this invention to provide an apparatus and method for continuously and rapidly detecting the oxygen content in a gas stream.

Another object is to detect continuously the oxygen content in human and animal breath, and record it on a real time basis.

Another object of this invention is to provide as the detecting component in an oxygen analyzer, a stable film comprising a fluorescing compound dissolved in a solvent or carrier, which film is supported on a substrate.

Other objects of the invention will become apparent from the description to follow.

THE INVENTION

According to the invention, it has been discovered that the rapid and continuous detection of oxygen in a gas stream may be accomplished by employing as the sensor, a fluorescent material whose fluorescence will be quenched by the presence of oxygen. The fluorescent material is dissolved in a solution which is supported as a stable and uniform film on a substrate.

Suitable fluorescent materials must be capable of absorbing exciting radiation in the range of 2000 –6500 A, and emitting radiation in the range of about 3000 –8000 A.

The fluorescent materials must have a sufficiently long fluorescent lifetime to provide a suitable signal/noise ratio with present-day equipment. Usually, the compound must have a fluorescent lifetime of at least $1 \times 10^{-9}$ seconds; if the fluorescent lifetime is too short, the quenching levels will be too small for efficient detection. Lifetimes as long as $1 \times 10^{-6}$ seconds are well known, and longer lifetimes up to $1 \times 10^{-4}$ seconds, if they exist, are suitable. Long fluorescent lifetimes increase detectability and enhance sensitivity.

Although not essential, it is preferable that the fluorescent yield of a material should be greater than 1 percent; for use with commercially available light detectors, the fluorescent yield should be greater than 10 percent.

Any exciting radiation may be employed if it emits in that portion of the 2000 –6500 A range which coincides with the absorption band of the material used as the sensor. Lasers, GaAs, mercury arcs, fluorescent tubes, tungsten lamps, electroluminescent devices, etc. may be used.

Typical compounds which may be employed as the fluorescent materials include: pyrene, coronene, p-terphenyl and similar aromatic hydrocarbons; however, any fluorescent materials capable of having their emission quenched by oxygen are suitable. The fluorescing lifetimes for pyrene, coronene and p-terphenyl are $5 \times 10^{-7}$, $3 \times 10^{-7}$ and $1 \times 10^{-9}$ seconds respectively.

The solvent or carrier for the fluorescent materials should be capable of sustaining a stable film on the substrate with respect to position, vapor pressure and chemical inertness. Also, the film must have the ability to rapidly absorb and rapidly purge or desorb oxygen from the gas stream as it passes directly over the film.

Examples of suitable solvents or carriers include mineral oil, decalin, glycerol, etc. Tetrahydrofuran and hexane which have high vapor pressures are also operable, but tend to evaporate too quickly. Solid greases, such as Apiezon N, (manufactured by Associated Electrical Industries) which has a vapor pressure of about $10^{-9}$ mm Hg, are also suitable. This material is commonly employed as a stopcock grease.

The thickness of the sensor film in part determines the time response of the apparatus. Generally, a thickness range of about 2 – 80 microns will permit a sufficiently rapid oxygen transfer (i.e., equilibration) to occur between the film and the gas above it.

The ability of the film to rapidly absorb and rapidly purge or desorb oxygen also determines the time response of the apparatus. Usually, a maximum response time of about 0.1 seconds will be afforded by a 2 – 80 micron thickness range of most films.

The concentration levels of the fluorescent materials in the solvent are determined by such factors as solubility, self-quenching characteristics, and the ability to absorb and emit radiation effectively.

For example, using a glass substrate, and film thicknesses varying from about 2 to about 80 microns, various conecntrations of pyrene, coronene, and ovalene were tested for their effectiveness.

A pyrene concentration of $1 \times 10^{-2}$ M in both mineral oil and also in glycerine was found suitable. In the case of coronene, a $1 \times 10^{-3}$ M concentration was effective. Ovalene was effective at a $1 \times 10^{-6}$ M concentration in mineral oil and was also effective at a $3 \times 10^{-6}$ M concentration in benzene.

Suitable substrates for the film include mirrors, glass, silk mesh, nylon mesh, stainless steel, chromatographic paper, quartz, copper, cloth mesh, plastic film, wick material, etc. It will be observed from this list that the substrates can be either transparent or opaque. Substrates which are good reflectors, such as white paper, mirrors, shiny metals, etc., may be employed to enhance the extinction coefficient of a compound which has a low solubility in the carrier. This is shown in greater detail in the embodiment of FIG. 2.

At least three types of supported films may be employed in this invention:

1. The fluorescent material may be dissolved in a solvent or carrier having a sufficiently low vapor pressure and high viscosity to sustain a stable film on a substrate. An example of this would be pyrene dissolved in mineral oil and supported on a glass tube. The solvent containing the fluorescent material may be applied by dip coating, spraying, swabbing, etc.

Another example would be of ovalene dissolved in mineral oil and coated on the surface of an electroluminescent substrate.

2. The fluorescent material may be dissolved in a solvent and cast into a gel. The gel is simply cast onto the substrate and remains in place. This technique is employed for solvents having high vapor pressures. An example of this would be pyrene dissolved in tetrahydrofuran and thickened with a thickening agent.

3. The fluorescent material may be adsorbed from solution onto a solid highly adsorbing substrate; an example of this would be pyrene dissolved in hexane and adsorbed on a sintered disc of silica gel, alumina, molecular sieves, etc.

If the fluorescent material is adsorbed onto such highly adsorbing substrate, it must then be coated by a water repellant material such as a plastic film, mineral oil, silicone oil, etc. This overcomes the problem of adsorption of contaminating substances onto the substrate and/or the fluorescent film such as water vapor and organic compounds.

The oxygen detector of the present invention may be operated at pressures of at least within the range from about 1/10 atmosphere to about 10 atmospheres total gas pressure. The oxygen detector responds only to the partial pressure in a gas stream; hence, it is independent of the total gas pressure. The detector is sensitive to oxygen at pressures of at least 0.01 – 1.0 atmosphere, the limitations being imposed by the limits of detection. Room temperatures are preferably employed when operating the detector. Pressures and temperatures outside these preferred ranges may be employed provided viscosity and vaporization characteristics of the solvent and fluorescent material are not adversely affected; also, it is necessary that the solubility and purging characteristics for oxygen are not impaired for a particular pressure-temperature relationship.

The invention may be understood more readily from the description to follow and the diagrams in which.

Figure 1:
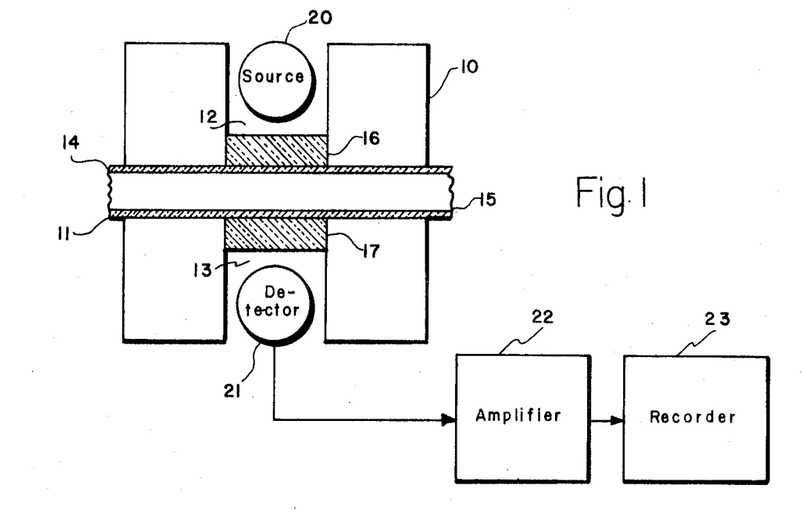
FIG. 1 is a sectional side elevation and schematic diagram of one form of the apparatus of this invention.

The apparatus of this invention is shown in FIG. 1 and comprises a housing 10 defining a central tubular annulus 11 and cavities 12 and 13. The bottom portions of the cavities are transparent to permit the passage of exciting radiation and fluorescing radiation therethrough. Positioned in the annulus 11 is a square shaped glass tube 14, ½ inch in diameter and 5 inches long bearing an oxygen detecting sensor film 15 of pyrene in mineral oil coated on the inside of the tube. The limitations on tube length are governed principally by hose connection requirements, detector size and adequate fluorescent intensity. The tube size can easily be reduced to 1 inch with only minor modifications in hose connections, size reduction of the detectors, etc. Filters 16 and 17 are positioned at the bottom of cavities 12 and 13 respectively. A source of exciting radiation 20 and detector 21 are positioned within cavities 12 and 13 respectively. The exciting radiation employed was a U.V.L. 22 lamp manufactured by Ultra-Violet Products, Inc. The output has an emission range of 3000 – 4000 A was a 3650 A peak. The detector employed was a 1P28 RCA photo-tube. Filter 16 transmits in the range of 3000 – 4000 A while filter 17 transmits in the range of 4200 – 4800 A.

Fluorescent radiation emitted from the film 15 is applied to the detector 21 which transmits a corresponding output signal to amplifier 22. The amplified signal is then fed to recorder 23 and a readout is obtained therefrom. The recorder was manufactured by Nesco Instruments as Model No. JX110–A–2.

Figure 3:
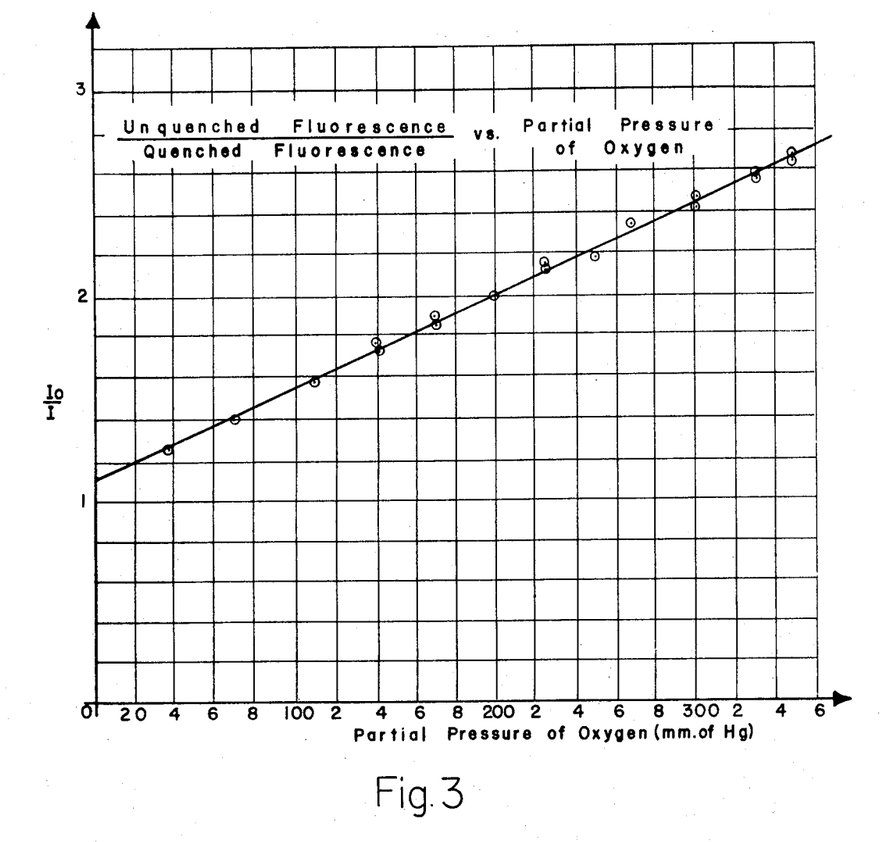
FIG. 3 is a graph showing the relationship between the partial pressure of oxygen in a nitrogen gas stream versus the ratio of unquenched (Io) to quenched (I) fluorescence using the apparatus of FIG. 1.

In operation, the apparatus was calibrated by continuously supplying pure nitrogen gas into the inlet end of tube 14 to obtain a reading for maximum fluorescence. Measured quantities of oxygen were then introduced along with the nitrogen stream into the inlet of tube 14, and the extent of fluorescent quenching due to oxygen was measured. FIG. 3 is a graph showing the relation between the ratio of unquenched to quenched fluorescence versus the partial pressure of oxygen. The readings were taken over a three day period at ambient temperature and pressure, and each point was measured independently three times.

It will be noted from the graph that the linearity is good and the repeatability is excellent. This means that Io/I is essentially linear in the range of 0–350 mm. $O_2$.

Figure 4:
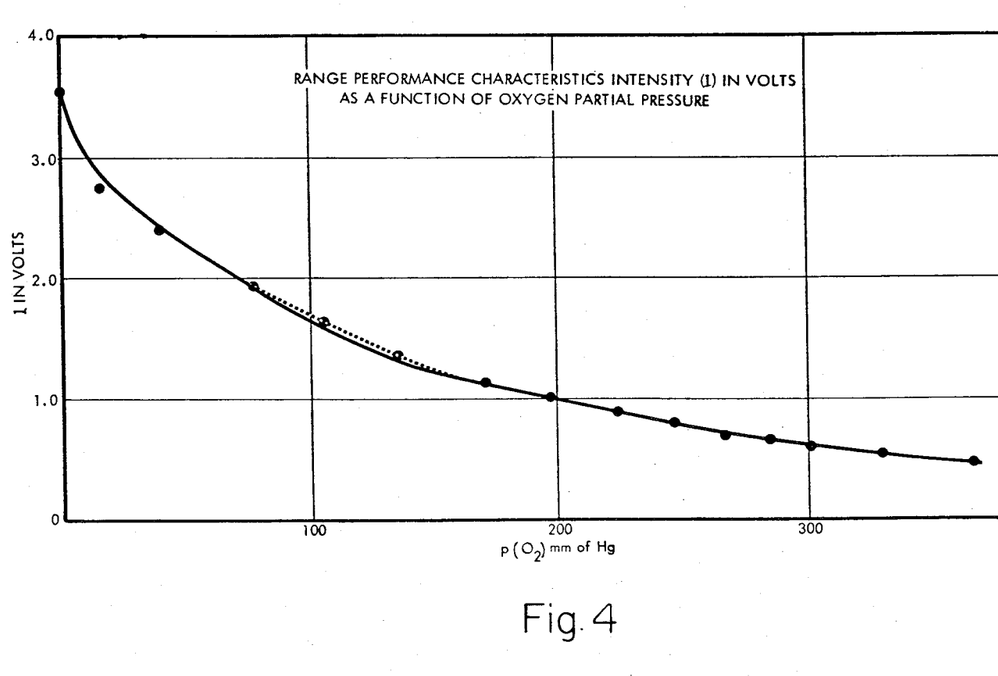
FIGS. 4 and 5 are graphs showing the relationship between intensity in volts and the partial pressure of oxygen.
Figure 5:
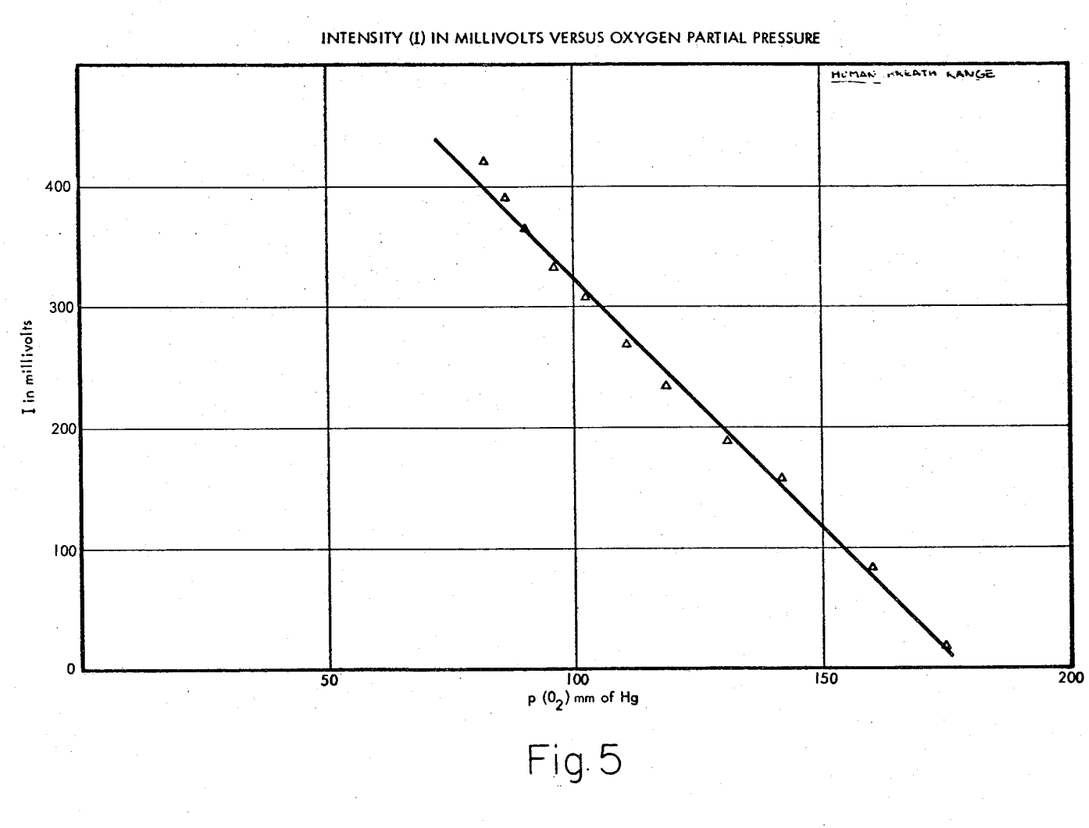

While the direct signal (i.e., I vs. Partial Pressure of oxygen) is a curve over the entire range, (shown in FIG. 4), small changes in the partial pressure of oxygen (e.g. in the 75 mm–150 mm range) are essentially linear and a direct reading can be obtained. This is shown in FIG. 5 which is an enlargement of the dotted segment of the curve of FIG. 4. Hence, when used in breath-by-breath analysis, signal processing is not required to obtain a direct reading when employing the apparatus of the present invention.

Figure 8:
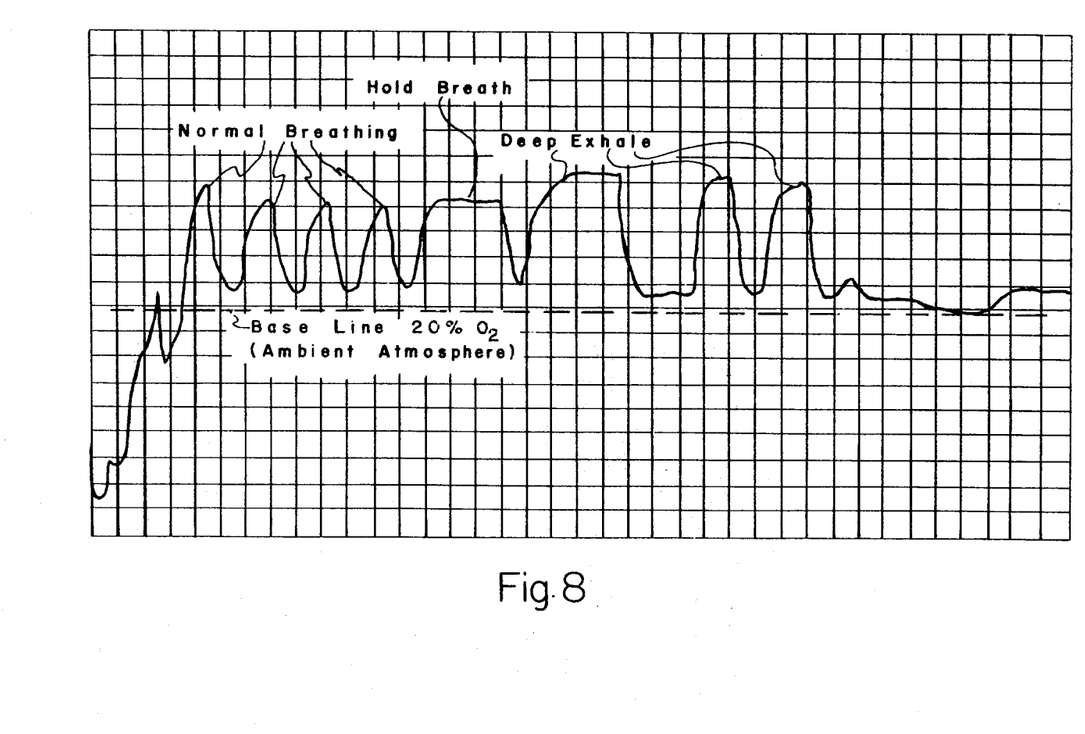
FIG. 8 is a chart showing the variation in oxygen content for various inhale-exhale breathing modes using the apparatus of FIG. 1.

The operation of the instrument was then applied to the detection of oxygen for various inhale-exhale modes of breathing. These included normal breathing, holding breath, and deep exhale, as shown in FIG. 8. This experiment was carried out in an atmosphere of normal air at an ambient temperature and atmospheric pressure. The baseline for the breathing modes represents a 20% oxygen content in the atmosphere. The sensitivity range of this apparatus employing pyrene in mineral oil is 1 to 100 percent. The accuracy of the apparatus in the 1–10 percent oxygen concentration range is ±0.5 percent while the accuracy in the 10–100 percent range is ±1 percent. This applies to flow rates of 100–13,000 cc. of gas per minute at S.T.P.

The signal to noise ratio of the device permits the resolution of 1 mm $O_2$ pressure to 759 mm $N_2$ pressure, i.e., a ratio of 760:1.

Figure 6:
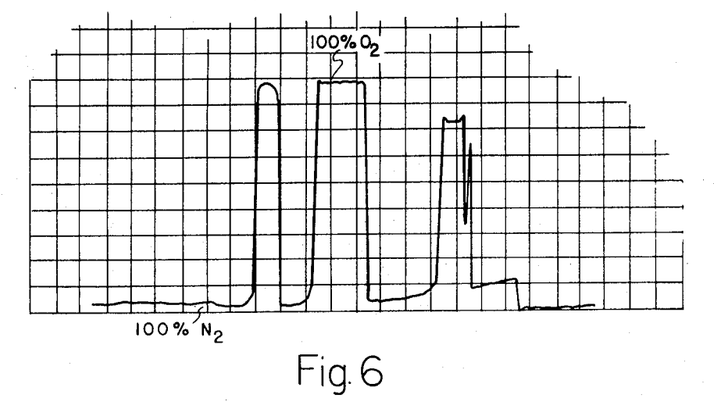
FIGS. 6 and 7 are strip charts showing the response of the apparatus of FIG. 1 to changes in oxygen concentration.

The chart of FIG. 6 shows the response time of the apparatus in which the oxygen concentration was changed at 0 percent and 100 percent. It will be observed that the response time is almost instantaneous. The chart speed was 1 inch per minute.

Figure 7:
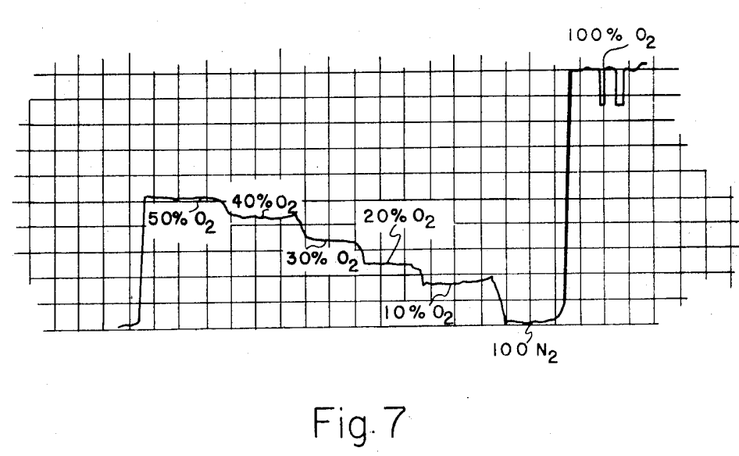

The chart of FIG. 7 similarly shows rapid response times to variations in oxygen concentration from 10 – 50 percent. The chart speed of FIG. 7 was 8 inches per minute.

The main factors which limit the response time of the apparatus of FIG. 1 is the pen recorder itself which has a response time of only about ½ second; also, since tubing (not shown) was used to supply gas to the glass tube 14, the apparatus response time was limited due to gas hydraulics factors.

Other recorders may, of course, be employed, such as an oscilloscope, digital device, bells, buzzers, etc. The recorder itself may be utilized for the output of other devices in patient care.

Figure 2:
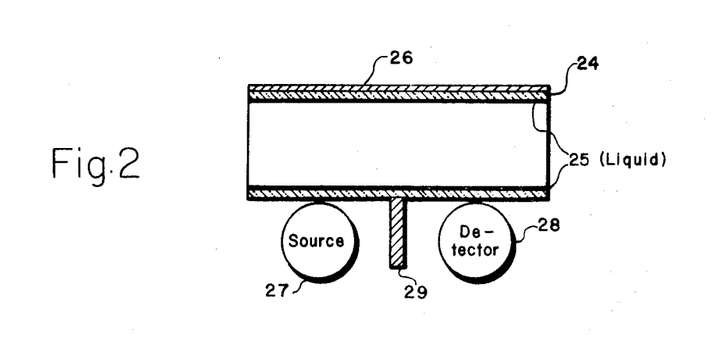
FIG. 2 is a sectional side elevation of another form of the apparatus used to detect reflected fluorescence.

In another embodiment of this invention, the apparatus shown in FIG. 2 provides a tube 24 coated on its inside surface with a sensor film 25. A reflecting surface 26 of aluminum is coated on the upper outside portion of the tube. The bottom portion of the tube is transparent. Exciting radiation from a source 27 passes through the transparent portion of tube 24 causing the sensor film 25 to fluoresce; this fluorescence is then reflected back to a phototube 28. A plate 29 is positioned between the detector 28 and source 27 to eliminate spurious readings. When an oxygen containing gas is passed through the inlet and into tube 24, it will quench the fluorescence of the sensor film. The fluorescence and the extent of quenching will produce a signal that is amplified and recorded in the same manner as in FIG. 1. The embodiment of FIG. 2 may be employed to enhance the radiation absorption and the fluorescence detection of a fluorescent material.

Figure 9:
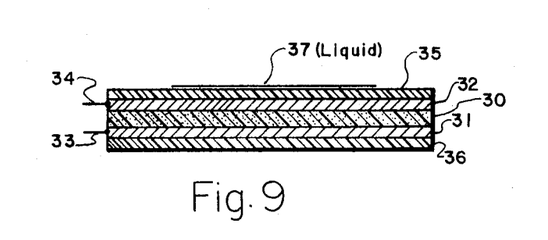
FIG. 9 is a sectional side elevation of one form of a sensor film on a substrate.

FIG. 9 shows another combination of sensor film and substrate employing an electroluminescent device as the source of exciting radiation.

The electroluminescent device comprises an assembly of a phosphor layer 30 disposed between an aluminum foil base plate 31 and an electrically conductive flexible plate 32. Leads 33 and 34 are connected to the base plate 31 and flexible plate 32 respectively. Transparent plastic sealing jackets 35, 36 encase this assembly. A sensor film 37 of ovalene in mineral oil coats the outer surface of sealing jacket 35.

When leads 33 and 34 are connected, the phosphor layer 30 emits exciting radiation causing the sensor film 37 to fluoresce. The measurement of the fluorescence and the extent of quenching due to oxygen will be detected, amplified and recorded as in FIG. 1.

Thus, it will be appreciated that the apparatus and process of this invention for analyzing a varying concentration of oxygen in a gas stream is not only accurate and exceedingly rapid in its determination, but is extremely simple. Furthermore, since the instrument operates on the principle of the quenching of fluorescence by oxygen, the detection process is insensitive to contaminating gases such as carbon dioxide, water vapor, CO, and most compounds which are employed as anesthetics during surgery. Furthermore, the instrument will respond to varying changes of oxygen concentration in the ambient air and liquids such as water. It can also detect $SO_2$, NO and $NO_3$. Finally, it is rugged, small and lightweight (about 10 pounds) thus permitting it to be easily carried by a user.

We claim:

1. An apparatus for continuously detecting oxygen in a gas stream which comprises:
   a sensor comprising a solvent and a fluorescent material dissolved therein;
   the fluorescent material having a fluorescent lifetime of at least $1 \times 10^{-9}$ seconds and capable of absorbing exciting radiation in the range of about 2000 – 6500 A and emitting in the range of about 3000 – 8000 A;
   said sensor being supported on the outer side of a substrate as a stable and uniform film;
   a source of radiation to excite said film;
   said exciting radiation emitting in the 2000 – 6500 A range;
   the fluorescence of said fluorescent material being quenchable by oxygen proportionally to the amount of oxygen absorbed in said film;
   means to detect the changes in fluorescence of said fluorescent material, said changes being proportional to the amount of oxygen present in the gas stream; and
   means to record said changes in fluorescence.

2. An apparatus for continuously detecting oxygen in a gas stream which comprises:
   a sensor comprising a solvent and a fluorescent material dissolved therein;
   the fluorescent material having a fluorescent lifetime of about $1 \times 10^{-9}$ to $1 \times 10^{-6}$ seconds; said fluorescent material being capable of absorbing exciting radiation in the range of about 2000 – 6500 A and emitting in the range of about 3000 – 8000 A; said fluorescent material having a fluorescent yield greater than about 1 percent;
   said sensor being supported on the outer side of a substrate as a stable and uniform film of about 2–80 microns thick;
   the response time of said film to equilibration of oxygen between the film and the gas above the film being a maximum of 0.1 seconds;
   a source of radiation to excite said film;
   said exciting radiation emitting in the 2000 – 6500 A range;
   the fluorescence of said fluorescent material being quenchable by oxygen proportionally to the amount of oxygen absorbed in said film;
   means to detect the changes in fluorescence of said fluorescent material, said changes being proportional to the amount of oxygen present in the gas stream; and
   means to record said changes in fluorescence.

3. An apparatus for continuously detecting in a gas stream, a gas selected from the class of compounds consisting of oxygen, $SO_2$, NO and $NO_3$ which comprises:
   a sensor comprising a solvent and a fluorescent material dissolved therein;
   the fluorescent material having a fluorescent lifetime of about $1 \times 10^{-9}$ to $1 \times 10^{-6}$ seconds; said fluorescent material being capable of absorbing exciting radiation in the range of about 2000 – 6500 A and emitting in the range of about 3000 – 8000 A; said fluorescent material having a fluorescent yield greater than about 1 percent;
   said sensor being supported on the outer side of a substrate as a stable and uniform film of about 2–80 microns thick;
   the response time of said film to equilibration of said gas between the film and the gas above the film being a maximum of 0.1 seconds;
   a source of radiation to excite said film;
   said exciting radiation emitting in the 2000 – 6500 A range;
   the fluorescence of said fluorescent material being quenchable by said gas proportionally to the amount of said gas absorbed in said film;
   means to detect the changes in fluorescence of said fluorescent material, said changes being proportional to the amount of said gas present in the gas stream; and
   means to record said changes in fluorescence.

4. The apparatus of claim 2 in which the solvent is selected from the class consisting of mineral oil, decalin, glycerol, tetrahydrofuran, benzene and hexane.

5. The apparatus of claim 2 in which the fluorescent material is selected from the class consisting of pyrene, coronene, p-terphenyl and ovalene.

6. The apparatus of claim 2 in which the fluorescent yield of said compound is greater than about 10 percent.

7. A process for continuously detecting oxygen in a gas stream which comprises:
   passing said gas stream over a sensor supported on the outer side of a substrate as a stable and uniform film;

said sensor film comprising a fluorescent material and a solvent therefor;

said fluorescent material having a fluorescent lifetime of at least $1 \times 10^{-9}$ seconds;

said fluorescent material being capable of absorbing exciting radiation in the range of about 2000 – 6500 A and emitting in the range of about 3000 – 8000 A;

irradiating said film with exciting radiation in the 2000 – 6500 A range;

the fluorescence of said fluorescent material being quenchable by oxygen in proportion to the amount of oxygen in said film;

equilibrating the oxygen between the film and the gas stream above it;

detecting the changes in fluorescence of said fluorescent material, said changes being proportional to the amount of oxygen present in the gas stream; and recording said changes in fluorescence.

8. A process for continuously detecting oxygen in a gas stream which comprises;

passing said gas stream over a sensor supported on the outer side of a substrate as a stable and uniform film;

said sensor film comprising a fluorescent material and a solvent therefor;

said fluorescent material having a fluorescent lifetime of about $1 \times 10^{-6}$ to $1 \times 10^{-9}$ seconds;

said fluorescent material being capable of absorbing exciting radiation in the range of about 3000 – 8000 A;

irradiating said film with exciting radiation in the 2000 – 6500 A range;

the fluorescence of said fluorescent material being quenchable by oxygen in proportion to the amount of oxygen in said film;

the response time of said film to equilibration of oxygen between the film and the gas stream above it being at most 0.1 seconds;

detecting the changes in fluorescent of said fluorescent material, said changes being proportional to the amount of oxygen present in the gas stream; and recording said changes in fluorescence.

9. A process for continuously detecting in a gas stream, a gas selected from the class consisting of oxygen, $SO_2$, NO and $NO_3$ which comprises:

passing said gas stream over a sensor supported on the outer side of a substrate as a stable and uniform film;

said sensor film comprising a fluorescent material and a solvent therefor;

said fluorescent material having a fluorescent lifetime of about $1 \times 10^{-6}$ to $1 \times 10^{-9}$ seconds;

said fluorescent material being capable of absorbing exciting radiation in the range of about 3000 – 8000 A;

irradiating said film with exciting radiation in the 2000 – 6500 A range;

the fluorescence of said fluorescent material being quenchable by said gas in proportion to the amount of said gas in said film;

the response time of said film to equilibration of said gas between the film and the gas stream above it being at most 0.1 seconds;

detecting the changes in fluorescent of said fluorescent material, said changes being proportional to the amount of said gas present in the gas stream; and recording said changes in fluorescence.

* * * * *